United States Patent Office 3,834,904
Patented Sept. 10, 1974

3,834,904
COPYING PROCESS UTILIZING A TRANSPARENT COMPOSITE FILTER WITH ELEMENTARY ZONES
Seiji Matsumoto and Satoru Honjo, Asaka, Japan, assignors to Fuji Shashin Film Kabushiki Kaisha, Minami-Ashigara-machi, Kanagawa, Japan
Continuation-in-part of abandoned application Ser. No. 691,825, Dec. 19, 1967. This application Dec. 4, 1972, Ser. No. 312,203
Int. Cl. G03c 5/04
U.S. Cl. 96—27 E                10 Claims

ABSTRACT OF THE DISCLOSURE

A method of copying which comprises optically combining an original to be copied with a transparent composite filter having therein two or more minute, elementary zones, each of which has substantially the same effective absorption factor defined in the specification in the sensitive region of a light sensitive copying material to be employed, differing in the spectral absorption characteristics in the same region, a pattern of one of said zones being not congruent with another pattern of said other zones, then subjecting to image exposure a light sensitive material having a sensitivity at least in a part of the visible region of the spectrum through the resulting combination, and thereby converting the difference of colors on said original into that of patterns on said filter to thus reproduce an image of the original.

---

This application is a continuation-in-part of U.S. Ser. No. 691,825, now abandoned.

BACKGROUND OF THE INVENTION

(1) Field of the Invention

This invention relates to a new copying process and, in particular, is concerned with an improved image copying process wherein, from multicolored original, there is formed a monochrome copy in which differences of color in the original are converted into a different crowd of minute patterns formed by any or combinations of said elemental zones.

(2) Description of the Prior Art

Most of the well known document copying methods employ light-sensitive silver-halide emulsion coatings, or the non-silver, light-sensitive recording members, such as xerographic or a light-sensitive diazonium material, any of which represents an image of an original through monochrome. The most important disadvantage of such methods is that there is no discrimination of color differences in the reproduced image. This means in a case, for example, red and black are both reproduced as black together, and means that it is impossible to judge what color it has. All colors are expressed by a monochrome characteristic of the recording method with only a discrimination thereof in density difference. Generally speaking, however, the colors of an image in an original used in each of the methods can hardly be distinguished. Even if colors are clearly different, distinguishing thereof is impossible in an image reproduced through monochrome, for example, when they both are deep or light in color. The foregoing methods will find wide use without fail if the colors of an image in an original can be distinguished.

The principal object of the invention is to obtain an image capable of distinguishing colors although relating to a reproduced monochrome image.

SUMMARY OF THE INVENTION

In accordance with the invention, there is provided a copying process which is characterized by optically combining an original to be copied with a composite filter having two or more elemental zones in which each of which has substantially the same effective absorption factor which will be defined hereinafter, clearly differing in the spectral absorption characteristics from each other, a pattern of one of said elemental zones being not congruent with any other patterns of said elemental zones, subjecting to image exposure a light sensitive material having a sensitivity at least in a part of the visible region of the spectrum through said combination, and thereby converting the difference of colors on said original into that of the patterns on said filter to thus reproduce a copy of the original.

BRIEF DESCRIPTION OF THE DRAWINGS

The present invention will now be illustrated in connection with the accompanying drawings wherein.

DETAILED DESCRIPTION OF THE INVENTION

Figure 1:
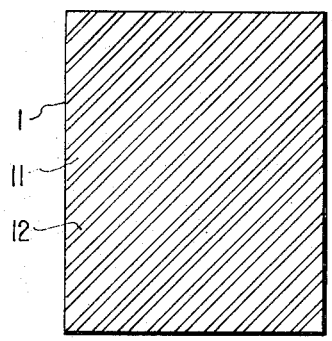
FIGS. 1, 4, 6 and 7 are plan views of the filters of the invention respectively, each illustrating a crowd of minute pattern.
Figure 2:
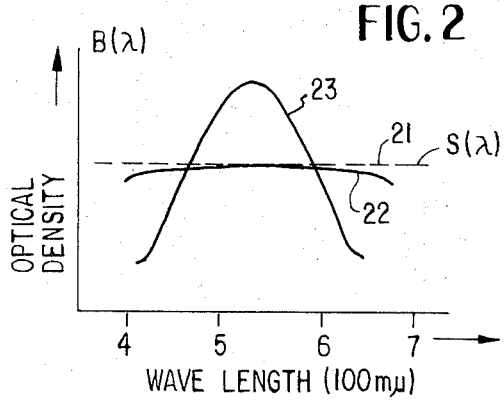

In one embodiment of the invention, as shown in FIG. 1, filter 1 has a size sufficient to cover an original to be copied. Filter 1 is composed of elemental zones 11 and 12 arranged alternately in the form of bands like a striped pattern. Elemental filter 11 is "grey" so as to give a substantially uniform characteristic of absorption to a light in the sensitive region of a light sensitive material used for copying, as shown by curve 22 in FIG. 2. The absorption characteristic curve of the light sensitive material is shown by 21 in FIG. 2. Elemental zone 12 has a smaller width than elemental zone 11 in the striped pattern, having a maximum absorption at a part of the sensitive range of the light sensitive material and substantially the same effective absorption density to the light sensitive material as elemental zone 11. In FIG. 2, the horizontal axis represents the wave length of light (unit; 100 millimicrons) and the vertical axis represents the optical density (unit not shown) which height gives a relative density difference.

If the sensitivity of a light sensitive material is represented by $S(\lambda)$ as a function of wave length of light and the energy distribution per unit wave length of a light source to be employed is $I(\lambda)$, an energy between wave lengths of from $\lambda$ to $\lambda+d\lambda$ will be given by $I(\lambda)\,d\lambda$. If the absorption factor of elemental zone 11 is $D_G$, and the absorption factor of elemental zone 12 is $B(\lambda)$ as a function of wave length, the effective absorption factor $B_{eff}$ of zone 12 to the light sensitive material and light source used is given by the relation.

$$B_{eff} = \frac{\int_{\lambda_1}^{\lambda_2} I(\lambda) B(\lambda) S(\lambda)\, d\lambda}{\int_{\lambda_1}^{\lambda_2} I(\lambda) S(\lambda)\, d\lambda}$$

where $\lambda_1$ and $\lambda_2$ are minimum wave length and maximum wave length in the sensitive region of the light sensitive material respectively. The composite filter employed in the present invention must be so composed that each different elemental zone therein has substantially the same effective absorption factor; in the case of the filter 1 in FIG. 1, the effective absorption factors of the two zones 11 and 12, $D_G$ and $B_{eff}$ must be substantially equal.

Such a filter is placed on an orginal and subjected to reproduction. In a case, for example, where elemental zone 12 has a maximum absorption in green, a green part of the original becomes dark like the striped pattern corresponding to filter 12, the striped pattern thus appearing in a reproduced image. A white part of the original appears uniformly, not as a pattern, in the reproduced image, since filters 11 and 12 have equal absorption factors therefor. A red or blue part of the original appears as another striped pattern, i.e., wider stripes than in the green part, since the part of 12 becomes lighter than that of 11. A green part is thus discriminated from a red or blue part in the reproduced image. A black part is reproduced in solid black, thereby being readily discriminated. Our experiments teach that stripes 11 and 12 have preferably a width of from 0.2 mm. to 3 mm. on a reproduced image in order to view the image well.

The pattern of filter 1 may be widely varied. Where filter 1 has a striped pattern as in the foregoing example, the width of zone 11 may be larger than that of zone 12 or vice versa. However, it is desirable to determine the pattern of a filter according to the original to be copied. In reproducing a figure including curves of different colors, for instance, horizontal or vertical stripes are preferred. It is necessary, in any case, that the elemental zones form patterns which are not congruent even partially, in other words, not put one upon another. Although the light intensity on the light sensitive material decreases because of the combinaiton of an original with such filter, this problem can be solved by increasing an amount of exposure.

Figure 3:
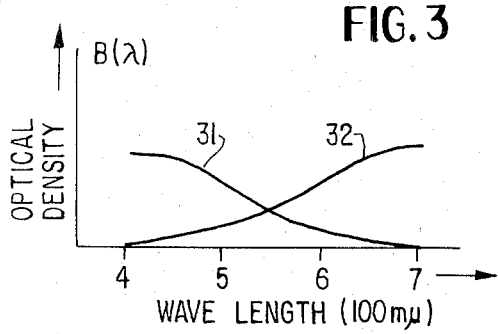

FIG. 3 shows another example of the absorption characteristic curves of elemental zones in a composite filter combined in the similar manner to FIG. 2. Elemental zones having the characteristics shown by curve 31 and curve 32 are combined as in the filter of FIG. 1. In a filter, for example, wherein zone 11 having the characteristic of curve 31 and zone 12 having the characteristic of curve 32 are combined, a light sensitive material and a light source are selected so that the effective absorption factor of each zone will be equal. In reproducing a copy by the use of this filter, a red part of an orginal is relativey light at zone 11 and dark at zone 12, and thus reproduced as a narrower stripe pattern, while a blue part thereof, being dark at zone 11 and light at zone 12, is reproduced as a wider striped pattern.

Figure 4:
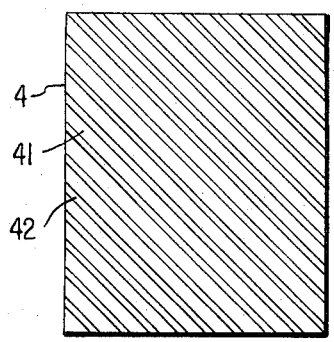

FIG. 4 shows a filter 4 composed of zone 41 and zone 42 in which the direction of stripe is vertical to that of the stripes of FIG. 1. The narrow stripe 42 has an absorption characteristic of FIG. 5, while the wide stripe 41 having the same absorption characteristic as zone 12 of FIG. 1. When carrying out copying by combining the filter FIG. 1, having the absorption characteristics of FIG. 3, together with the filter of FIG. 4, a green part of the original becomes reversely slant stripes, while red and blue being discriminated as mentioned before, and, consequently, blue, green and red are all discriminated.

Each elemental zone in a composite filter for use in the present invention must have a clearly different absorption characteristic with each other in the sensitive region of a light-sensitive material to be used.

As is shown in the foregoing examples, when one of the zones is "grey," the other must have a sharp absorption maximum in the region. When, on the other hand, each of the two zones has a sharp absorption maximum, the wave length at the peak absorption must be sufficiently separated from that of the other zone, at least by about 100 millimicrons.

Figure 6:
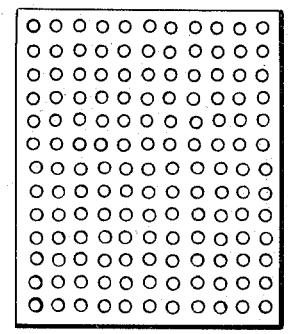

In a still further embodiment of the invention, as shown in FIG. 6, a filter having a maximum absorption in a certain wave length is incorporated in a grey filter having an absorption characteristic such as that of filter 11 of FIG. 1 so as to be in the form of a mosaic. This filter is favorably adapted to copying of a colored map or rod graph, but not to copying of a color curve graph.

Figure 5:
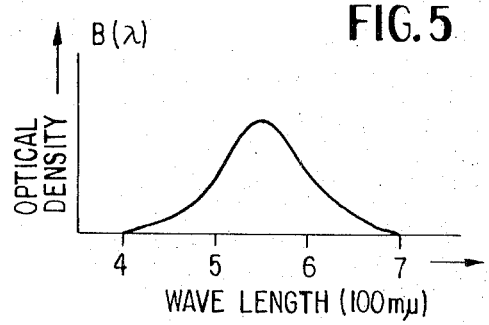
FIGS. 2, 3 and 5 are absorption characteristic curves of the elemental zones in the filters for use in the invention respectively.

In practical use, a filter having the absorption characteristic of FIG. 5 and being arranged as shown in FIG. 6 may be placed on another filter having the absorption characteristic of FIG. 3 and being arranged as shown in FIG. 4. The size of mosaic is preferably small to reproduce sufficiently the shape of the pattern of an original, although a size of 0.2-3 mm. is practically preferred, since it hardly can be varied if less than that.

Although the foregoing illustration is limited to a positive-positive process wherein a light area of an original is reproduced light in a copied image, a similar discrimination of colors can be expected in a negative-positive process wherein a light area of an original is reproduced dark, and different colors in the original can be converted into different patterns.

In practicing the present invention, the composite filter may be inserted at any position along the light path between the light path between the light source and the light sensitive copying material, not only on an original, but also on a sensitive plate. Moreover, a similarly excellent effect can be attained in the case where an optical image of a filter of the invention is projected on an original while the original is illuminated with a spectroscopically modulated light.

As is evident from the foregoing detailed illustration, the present invention makes it possible to copy or reproduce a colored original with discrimination of the difference of the colors thereof through monochrome and, accordingly, will find wide use in the art of copying.

Regarding the light source which may be used with this invention, the energy distribution of which corresponds to $I(\lambda)$, any light source may be used such as a tungsten bulb, a tungsten bulb containing iodine, an iodine bulb, a xenon bulb, or a white fluorescent tube.

Regarding the light sensitive material, the sensitivity of which corresponds to $S(\lambda)$, any light sensitive material may be used whether organic or inorganic. Such well known materials are silver halide emulsion coatings, or the non-silver, light sensitive recording members such as xerographic or light sensitive diazonium members, the xerographic members including members comprising zinc oxide, cadmium sulfide, selenium, and other known inorganic materials together with known organic materials such as anthracene, chrysene, benzidine, poly-N-vinylcarbazole, polyvinylnaphthalene, and polyvinylanthracene. Further, if desired, the sensitivity of the materials can be extended over the light sensitive range by any of the well known sensitizing agents for effecting this such as those disclosed in U.S. Pat. 3,647,428. Preferably, although not necessarily, the sensitivity of the light sensitive material should be substantially constant over the wavelength range for which colors in the original are to be discriminated. Thus, if the only colors to be discriminated in the original are green and red, the sensitivity of the light sensitive material should be substantially constant over the wavelength range encompassing the red and green colors.

It is further preferable, although once again not necessary, that the light sensitive materials have a uniform or substantially constant sensitivity over the entire visible region. Examples of such light sensitive materials are (1) selenium-tellurium as disclosed in U.S. Pat. No. 3,355,289 for use in xerographic light sensitive plates and the like having an extended sensitivity in the range of the visible spectrum, (2) Tri-X Pan manufactured and sold by the Eastman Kodak Company and (3) electrophotographic material such as those discussed in U.S. Pat. 3,051,569.

Regarding the composite filter 1 and, in particular, the elemental zones thereof, any materials may be used so long as the effective absorption factors of the elemental zones are substantially equal and so long as the absorption factors of the elemental zones are different. Thus, for the composite filter corresponding to FIGS. 1 and 2, Wratten filter CCM 50M (Magenta) may be used as elemental filter 12 while Neutral Density (filter density 0.8) (Green)

may be used as elemental filter 11. In FIG. 3, the absorption factor or filter characteristic corresponding to curve 31 may be obtained using Wratten No. 23 (Orange) while the absorption factor corresponding to curve 32 may be obtained using Wratten No. 64 (Sky Blue). Another combination which may be used in connection with FIG. 3 is a Wratten Light Balancing Filter CC No. 81EF (Orange), which would correspond to curve 31 of FIG. 3 and Wratten Light Balancing Filter CC 50C (Sky Blue), which corresponds to curve 32. Referring to FIG. 5, a filter having the absorption factor shown therein is Wratten No. CCM 50M (Magenta).

Figure 7:
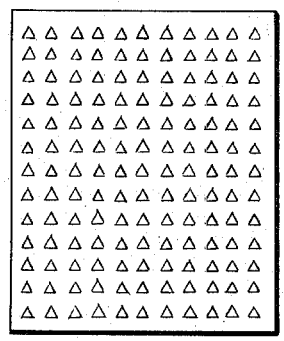

The filter of the present invention (for example) of FIGS. 1 and 4 can be produced by cutting each of the above described filters in the form of ribbons and arranging and securing them like a striped pattern on a transparent resinous layer such as cellophane. Typically, the width of the stripes 12 and 11 might be 0.5 mm. and 1 mm. respectively or they might be 0.3 mm. and 0.5 mm. Of course, other patterns can be utilized such as those shown in FIGS. 6 and 7; thus, the above illustrative width dimensions would not apply to a pattern which does not include ribbon-like stripes. Further, the above illustrative dimensions together with the range specified hereinbefore are not intended to be limiting on the range for effecting discrimination between different colors in a color original. The foregoing range specified hereinbefore has been found to be preferable; however, the important factor is the amount of resolution that the human eye is capable of and, of course, this may extend over a much broader range than that specified hereinbefore.

Further, with respect to the composite filters used in this invention, they can be readily manufactured by those of ordinary skill in this art by utilizing the conventional methods for producing a mosaic filter or a disintegrating filter used in color film. Or commercially available color film exposed through a composite filter as described hereinbefore may also be used as a composite filter in this invention. Also, the technique for preparing a mosaic filter as described in British Pat. 623,130 may be used.

Any colored original may be reproduced in accordance with the present invention. As stated hereinbefore, the embodiment of FIG. 6 has particularly desirable utility when employed to reproduce colored maps or rod graphs. Nevertheless, the invention can be used with colored originals containing relatively large areas of different solid colors or color curve graphs or color prints or slides of an outdoor scene or a portrait.

Referring to the effective absorption factor as defined hereinbefore, the following should be noted. First, it is not necessary that $I(\lambda)$ or $S(\lambda)$ be substantially constant or uniform over the wavelength range that the invention is used. However, in certain preferred embodiments $S(\lambda)$ is substantially constant over the wavelength range to be used while in other embodiments, the product of $I(\lambda)$ and $S(\lambda)$ is substantially constant over the wavelength range to be used. With respect to the embodiment where the product of $I(\lambda)$ and $S(\lambda)$ is constant the following should be noted. Typically, a single light source is used and a single light sensitive material. Thus, the light from the light source may be reflected from or transmitted through the colored original, the light from the original being directed to the light sensitive material or layer through the composite filter shown in FIGS. 1, 4, 6, or 7. Of course, the filter may also be placed between the light source and the colored original. Since there is but one light source and one light sensitive material, it is clear that when the effective absorption factors of elements 11 and 12 of FIG. 1, for example, are made to be substantially equal to one another, the denominators in the expressions for the effective absorption factors as given hereinbefore may be cancelled. Note that exact equality is not necessary between the respective effective absorption factors but rather only approximate equality. Thus, once the denominators have been cancelled out, the following approximation results.

$$\int_{\lambda_1}^{\lambda_2} I(\lambda) B_{11}(\lambda) S(\lambda) d\lambda \doteq \int_{\lambda_1}^{\lambda_2} I(\lambda) B_{12}(\lambda) S(\lambda) d\lambda$$

where $I(\lambda)$, $S(\lambda)$, $\lambda_1$, and $\lambda_2$ have been defined hereinbefore and $B_{11}(\lambda)$ is the absorption factor for elemental filter 11 while $B_{12}(\lambda)$ is the absorption factor for elemental filter 2. If the product of $I(\lambda)$ and $S(\lambda)$ is substantially constant over the wavelength range to be used, the above expression may be simplified as follows:

$$I(\lambda)S(\lambda)\int_{\lambda_1}^{\lambda_2} B_{11}(\lambda) d\lambda \doteq I(\lambda)S(\lambda)\int_{\lambda_1}^{\lambda_2} B_{12}(\lambda) d\lambda$$

Thus, the effective absorption factors are equal in this embodiment whenever the areas underneath the respective absorption factor curves of the elemental filter zones are equal. Referring to FIG. 2, the area over the wavelength range extending from approximately 400 to 700 microns under the absorption factor curve 22 is substantially equal to the area under the curve 23. It should be noted that optical density in FIGS. 2, 3, and 5 corresponds to the absorption factor—that is, $B(\lambda)$ as used in the expression for the effective absorption factor. Thus, the effective absorption factors for elemental filters 11 and 12 of composite filter 1 will be equal whenever the filters described hereinbefore are used for these elemental filters and when the product of $I(\lambda)$ and $S(\lambda)$ is substantially equal over the wavelength range extending from approximately 400 to 700 millimicrons.

It should be further noted with respect of FIG. 3 that the areas under curves 31 and 32 are also equal to one another over the wavelength range extending approximately from 400 to 700 millimicrons and thus, when the filters described hereinbefore are used to implement the absorption factors 31 and 32, the effective absorption factor for each of these elemental filters will once again be substantially equal whenever the product of $I(\lambda)$ and $S(\lambda)$ is substantially constant over this wavelength range.

Thus, whenever the product of $I(\lambda)$ and $S(\lambda)$ is constant the well known physical data on various filters may be utilized to effect a desired combination of elemental filters which will have equal effective absorption factors while at the same time will permit discrimination between various colors of the original. Thus, in the embodiment of FIG. 2 discrimination is provided between green and red or blue while in the embodiment of FIG. 3, discrimination is provided between red and blue.

A further experimental approach to ascertain that the effective absorption factors of each of the filters is equal is to expose a white portion of the original through each of the elemental filter zones. If each portion of the copy corresponding to an elemental filter zone is substantially the same shade of white as the other portions of the copy corresponding to other elemental filter zones, then it can be concluded that the selection process was correct and that the effective absorption factors for the different elemental filter zones are equal. In fact, the reason for making the effective absorption factors of the different elemental filter zones substantially equal is to cause a white portion of the original to be reproduced in a substantially constant shade of white in spite of the pattern of elemental filter zones. In this regard, it should be further appreciated that even if there is a noticeable variation in the shades of white because the effective absorption factors not being exactly equal, these variations in the shades of white (one shade of white being different from another if it is grayer than the other example) can be tolerated if their extent of variation is noticeably less than the variation which occurs when a color is reproduced. Thus, for example, if red is reproduced, the contrast between the black and white stripes should be very distinct. If the variations between the shades of white for a white portion of the original are noticeably less than the variation or contrast between the black and white stripes for the color red, then the effective absorption factors are sufficientyl equal for purposes of practicing this invention. Generally, the ratio of the effective absorption factors may vary approximately from 5:1 to unity (equal absorption factors) and preferably from 1.5:1 to unity.

As a further illustration of factors entering into the selection of appropriate elemental filters, reference should be made to FIG. 2. The optical density or the absorption factor of a grey or neurtal filter can extend over a wide range. Thus, once a filter having a characteristic or absorption factor corresponding to curve 23 is selected, the area under the curve 22 can be ascertained and then a grey filter, whose optical density results in area equal to the under curve 23, can readily be selected. Hence, the selection of appropriate filters is quite straightforward in the embodiment of FIG. 2.

The following examples are now given to illustrate how suitable filters, light sources and light sensitive materials may be selected to practice the invention, the scope of the invention not, of course, being limited to these examples.

EXAMPLE 1

The invention was practiced using Tri-X Pan, a light sensitive material manufactured by Eastman Kodak Company, and a composite filter consisting of CCM 50 and Neutral Density Filter ND 0.3 as the elemental filter. The elemental filters were secured as ribbons as shown in FIG. 1 on a transparent resinous layer with CCM 50 corresponding to the elemental filter 12 and ND 0.3 corresponding to elemental filter 11. The width of ND 0.3 was approximately 10 mm. while the width of CCM 50 was about 3 mm. A tungsten lamp was used as the light source.

Figure 8:
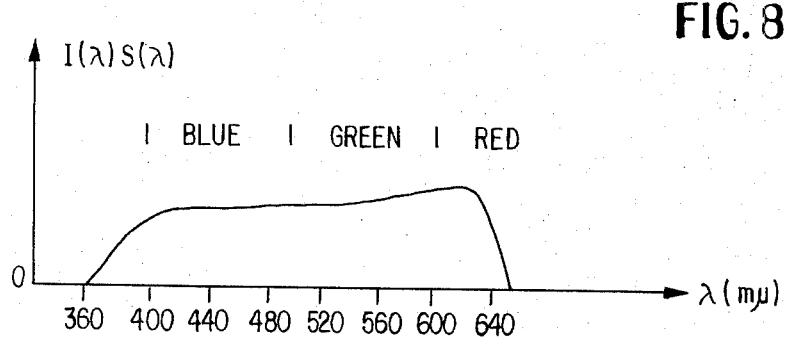
FIGS. 8–13 illustrate various characteristic curves used in the examples of the invention.

The spectrogram of Tri-X Pan to the tungsten lamp was prepared, as shown in FIG. 8, which is based on sensitometric data disclosed in Eastman Kodak Co. literature which is publicly available.

Figure 9:
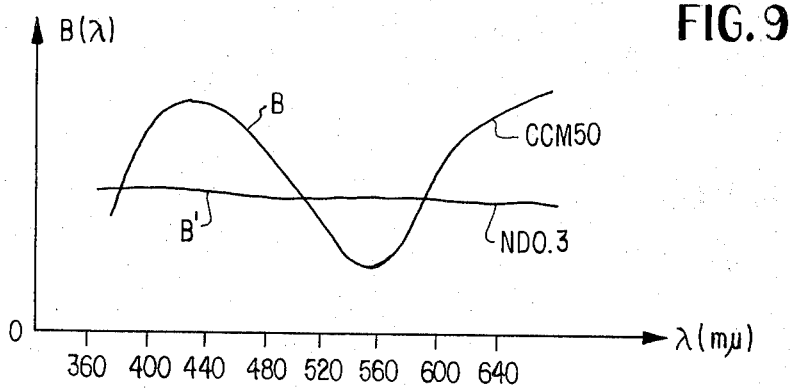

The absorption factors of CCM 50 obtainable from the data given for CC50M in publicly available literature and ND 0.3 (well known to have a uniform 50% transmittance are shown in FIG. 9.

Figure 10:
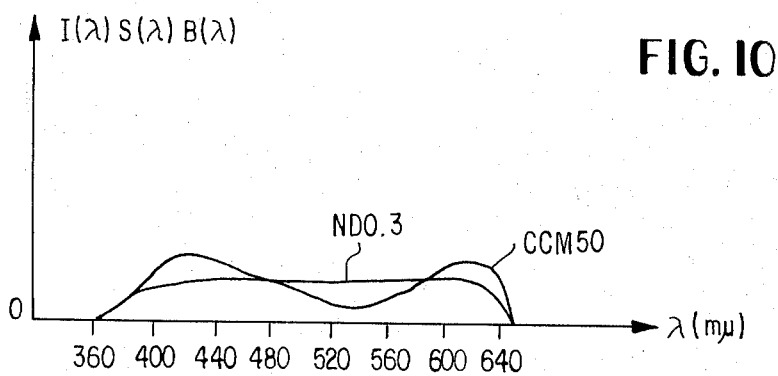

From FIGS. 8 and 9, the graph of FIG. 10 in which the value of $I(\lambda) \cdot S(\lambda) \cdot B(\lambda)$ can be derived, where the ordinate corresponds to the amount of light absorbed by the light sensitive material from the light passed through the composite filter.

Referring to FIG. 9, if the area surrounded by the absorption factor curve of CCM 50 and the line 360–650 m$\mu$, that is $\int B(\lambda)d\lambda$ is compared with the area surrounded by the curve of ND 0.3 and the line 360–650 m$\mu$, that is $\int B'(\lambda)d\lambda$, the area surrounded by the curve of CCM 50 is slightly greater but may be regarded as substantially equal. Also, if the area surrounded by the curve of CCM 50 and the line 360–650 m$\mu$ in FIG. 10, that is $\int I(\lambda)S(\lambda)B(\lambda)d\lambda$ is compared with the area surrounded by the curve of ND 0.3 and the line 360–650 m$\mu$, that is $\int I(\lambda)S(\lambda)B(\lambda)d\lambda$, the area of the former is 56% and the area of the latter is 50% when the amount of light absorbed by the light sensitive material directly without using a filter is assumed to be one. The ratio of these values is almost the same as the ratio of $\int B(\lambda)d\lambda$ to $\int B'(\lambda)d\lambda$ mentioned above.

Using the aforementioned tungsten light source, composite filter and Tri-X Pan film, a copy was prepared from an original. The orginial was a simulated bar or rod graph comprising a colorless resinous, transparent backing upon which were secured a plurality of different colored translucent stripes—that is, one of the stripes was green, the second was blue, and the third was black and opaque. The film was exposed from the light source through the original and the composite filter and then developed in a manner conventional in photography. It was observed from the copy prepared from the original using the aforementioned composite filter consisting of CCM 50 and ND 0.3 that while portion of the copy corresponded to the colorless portion of the original and that no striped pattern of the filter was observed in the white portion of the copy.

EXAMPLE 2

The invention was practiced using a selenium light sensitive xerographic plate as light sensitive material, the same composite filter as that of Example 1, and a tungsten lamp as light source.

Figure 11:
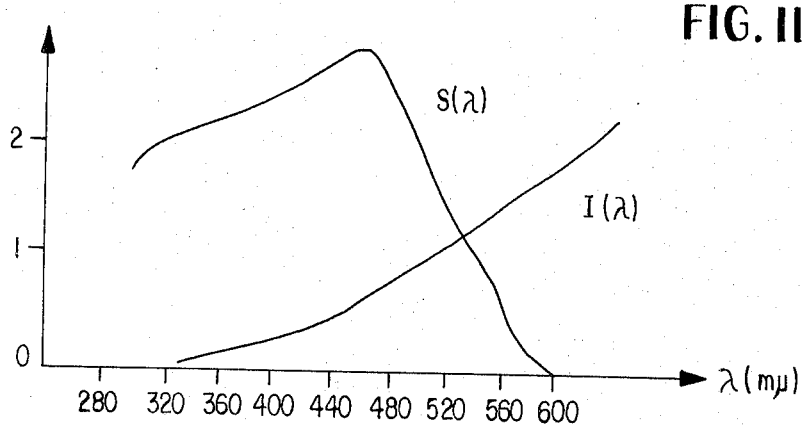

The sensitivity of the selenium light sensitive plate and the energy distribution curve of the tungsten lamp are as shown in FIG. 11 and are provided in publicly available literature.

Figure 12:
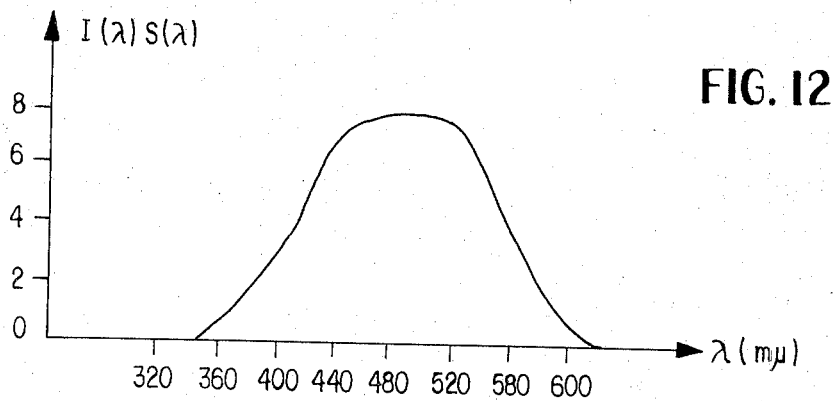

A graph in which the value of the product of $I(\lambda)$ of the tungsten lamp and $S(\lambda)$ of the light sensitive plate, or the value of $I(\lambda) \cdot S(\lambda)$ is shown in FIG. 12.

Figure 13:
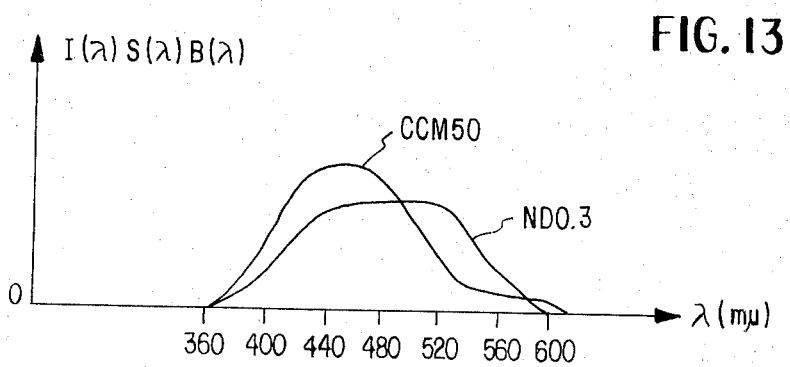

The absorption factors of each element of the composite filter used in this example are shown in FIG. 9. From the above FIGS. 9 and 12, a graph is provided in FIG. 13, the ordinate of which is amount of the light absorbed by the light sensitive plate from the light passed through the composite filter. Referring to FIG. 13, if the area surrounded by the curve of CCM 50 and the line 360–650 m$\mu$, or $\int I(\lambda)S(\lambda)B(\lambda)d\lambda$ is compared with the area surrounded by the curve of ND 0.3 and the line 360–650 m$\mu$, or $\int I(\lambda)S(\lambda)B'(\lambda)d\lambda$, the former is 52% and the latter is 50% when the amount of light absorbed by the light sensitive material directly without using a filter is assumed to be one which shows the former being almost equal to the latter.

Using the aforementioned tungsten light source, composite filter and selenium plate, a copy was prepared from the original used in Example 1, the plate being uniformly charged in a manner conventional in xerography and then exposed from the light source through the original and the composite filter and then developed with a conventional toner, the developed image then being transferred to the copy sheet. The same good results as were obtained in Experiment 1 were also obtained in Experiment 2.

In this example, it can be seen from FIG. 12 that, over the wavelength range of interest—that is, approximately 360–650 m$\mu$, $I(\lambda) \cdot S(\lambda)$ is not constant although it is substantially constant from 440–520 m$\mu$. Further, with respect to Example 1, $I(\lambda) \cdot S(\lambda)$ is substantially constant over the wavelength range of interest.

Example 3

This invention was also practiced using Electrofax paper as the light sensitive material, the composite filter of Example 1, and a white fluorescent lamp as the light source. The original was a simulated bar or rod graph comprising a colorless resinous, transparent backing upon which was secured a plurality of different colored translucent stripes—that is, one of the stripes was green, the second was red, and the third was black and opaque. The Electrofax paper was exposed from the light source through the original and the composite filter. Although the striped pattern was slightly observed in the white portion of the copy (corresponding to the colorless portion of the original), the difference in color in the original could be discriminated without difficulty.

What is claimed is:

1. A method of copying which comprises
    optically combining a multi-colored original to be copied with a transparent composite filter having therein at least two or more patterns of elementary zones, at least one dimension of both the zones of said two patterns being such that each zone of all said patterns is distinguishable from all other zones of all said patterns by unaided human vision, each pattern having an effective absorption factor $B_{eff}$ in the light sensitive region of a light sensitive copying material to be employed; where $$B_{eff} = \frac{\int_{\lambda_1}^{\lambda_2} I(\lambda)B(\lambda)S(\lambda)d\lambda}{\int_{\lambda_1}^{\lambda_2} I(\lambda)S(\lambda)d\lambda}$$

and where $I(\lambda)$ = the energy distribution per unit wave length of a light source to be employed;

$B(\lambda)$ = the absorption factor of the elemental zone as a function of wavelength;

$S(\lambda)$ = the sensitivity of the light sensitive material as a function of wavelength;

$\lambda_1$ = the minimum wavelength in the sensitive region of the light sensitive material; and $\lambda_2$ = the maximum wavelength in the sensitive region of the light sensitive material, one of said patterns (1) having a different $B(\lambda)$ over the light sensitive region than another pattern of said zones, (2) not being congruent with said another pattern of said zones and (3) having an effective absorption factor five to one times greater than said another pattern; and subjecting to image exposure said light sensitive material having a sensitivity at least in a part of the visible region of the electromagnetic spectrum through the said composite filter and thereby producing on said copying material a monochrome image where each portion of said image corresponding to a given color of said original has a unique pattern corresponding to said color where each zone of said unique pattern is distinguishable from all other zones of all unique patterns by unaided human vision and is a function of (1) said two or more patterns of elemental zones and (2) the said absorption factor of each said zone.

2. A method of copying as described in claim 1 wherein said one pattern of zones in the composite filter is grey, while the said another pattern of zones has an absorption factor $B(\lambda)$ exhibiting an absorption maximum in the sensitive region of the light sensitive material employed to produce a copy.

3. A method of copying as described in claim 1 wherein each pattern in the composite filter has an absorption factor $B(\lambda)$ exhibiting an absorption maximum in the sensitive region of the light sensitive material employed to produce a copy, the wave length of said maximum of said one pattern being separated from that of said another pattern at least by about 100 millimicrons.

4. A method as in claim 1 where $S(\lambda)$ is substantially constant from $\lambda_1$ to $\lambda_2$.

5. A method as in claim 1 where the product of $S(\lambda)$ an $I(\lambda)$ is substantially constant from $\lambda_1$ to $\lambda_2$.

6. A method as in claim 1 wherein said effective absorption factors of said one and another patterns of zones vary from 1.5:1 to unity.

7. A method as in claim 1 where said effective absorption factors of said one and another patterns of zones are substantially the same.

8. A method as in claim 1 where at least one dimension of both the zones of said one and another patterns range from 0.2 mm. to 3 mm.

9. A method as in claim 1 where said one and another patterns of zones are both continuous strips alternately disposed in parallel with one another, the width of said strips ranging from 0.2 mm. to 3 mm.

10. A method as in claim 1 where said one another patterns of zones comprise a mosaic, at least one dimension of both the zones of said one and another patterns ranging from 0.2 mm. to 3 mm.

References Cited

UNITED STATES PATENTS

| | | | |
|---|---|---|---|
| 3,085,878 | 4/1963 | Archer | 96—118 |
| 3,676,122 | 7/1972 | Hellmig | 96—45 |
| 2,061,182 | 11/1936 | Zeller | 96—118 |
| 1,889,124 | 11/1932 | Kelley | 96—118 |
| 2,992,103 | 7/1961 | Land et al. | 96—45 |

RONALD H. SMITH, Primary Examiner

E. C. KIMLIN, Assistant Examiner

U.S. Cl. X.R.

96—45, 118